(12) United States Patent
Soman et al.

(10) Patent No.: US 11,010,146 B2
(45) Date of Patent: May 18, 2021

(54) UNIFIED MANAGEMENT OF HETEROGENEOUS APPLICATIONS

(71) Applicant: VMware, Inc., Palo Alto, CA (US)

(72) Inventors: Sisimon Soman, Palo Alto, CA (US); Jairam Choudhary, Palo Alto, CA (US); Vignesh Raja Jayaraman, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 52 days.

(21) Appl. No.: 16/444,934

(22) Filed: Jun. 18, 2019

(65) Prior Publication Data
US 2020/0401387 A1    Dec. 24, 2020

(51) Int. Cl.
*G06F 9/445* (2018.01)
*G06F 8/61* (2018.01)
*G06F 16/188* (2019.01)
*G06F 9/455* (2018.01)

(52) U.S. Cl.
CPC ............ *G06F 8/61* (2013.01); *G06F 9/45508* (2013.01); *G06F 16/188* (2019.01)

(58) Field of Classification Search
CPC ............. G06F 11/3452; G06F 11/3616; G06F 11/3082; G06F 11/3419; G06F 11/3612; G06F 11/302; G06F 11/3505; G06F 8/61; G06F 8/60; G06F 8/65; G06F 9/45508; G06F 16/188; G06F 16/192
USPC ........................................................ 717/175
See application file for complete search history.

(56) References Cited

U.S. PATENT DOCUMENTS

| 8,335,902 | B1* | 12/2012 | Feathergill | G06F 11/1466 711/162 |
| 8,850,146 | B1* | 9/2014 | Majumdar | G06F 9/45558 711/162 |
| 2006/0064441 | A1* | 3/2006 | Yamamoto | G06F 16/10 |
| 2012/0084775 | A1* | 4/2012 | Lotlikar | H04L 67/1097 718/1 |
| 2012/0216181 | A1* | 8/2012 | Arcese | G06F 8/65 717/168 |
| 2013/0132942 | A1* | 5/2013 | Wang | G06F 9/45504 717/176 |

(Continued)

OTHER PUBLICATIONS

Title: Petal: Distributed virtual disks; author: EK Lee, published on 1996, source: ACM org.*

(Continued)

*Primary Examiner* — Chameli Das
(74) *Attorney, Agent, or Firm* — Patterson + Sheridan, LLP

(57) ABSTRACT

Certain embodiments described herein are generally directed to executing applications on a computing device. In some embodiments, a method includes receiving, by an app store interface, a first distribution package from an app store, the first distribution package comprising a first virtual disk file comprising an application. The method further includes opening, by an application agent, the first virtual disk file based on a file type association (FTA) between the first virtual disk file and the application agent. The method further includes storing, by the application agent, the application in a second virtual disk file. The method also includes mounting the second virtual disk file at the computing device. The method also includes executing the application stored on the mounted second virtual disk file.

20 Claims, 4 Drawing Sheets

(56) References Cited

U.S. PATENT DOCUMENTS

| | | | | |
|---|---|---|---|---|
| 2015/0106802 A1* | 4/2015 | Ivanov | ............... | G06F 9/45558 |
| | | | | 718/1 |
| 2016/0085837 A1* | 3/2016 | Kotagiri | ................. | G06F 16/27 |
| | | | | 707/634 |
| 2016/0124676 A1* | 5/2016 | Jain | ...................... | G06F 3/0641 |
| | | | | 713/176 |
| 2016/0203162 A1* | 7/2016 | Kacin | .................. | G06F 16/188 |
| | | | | 707/626 |
| 2016/0292135 A1* | 10/2016 | Mowatt | ................ | G06F 40/186 |
| 2016/0301680 A1* | 10/2016 | Main | .................... | H04L 63/083 |

OTHER PUBLICATIONS

SSD-HDD—hybrid virtual disk in consolidated environments ; autor: H Jo, et al, published on 2009.*

Virt cache: managing virtual disk performance variation in distributed file systems for the cloud; author: RV Arumugam et al, source : IEEE ; published on 2014.*

\* cited by examiner

UNIFIED MANAGEMENT OF HETEROGENEOUS APPLICATIONS

BACKGROUND

In a traditional application delivery model, applications are provisioned on a computing device (e.g., physical computing device, such as a server, workstation, etc., or a virtual computing instance, such as a virtual machine, container, etc.) in a one-to-one manner, where for each individual computing device a separate copy of each application is installed on physical disks of the computing device. In a data center (e.g., in an enterprise) with many computing devices, multiple administrators of the data center may therefore be required to manage installations, updates, or deletion of applications on computing devices, which can be a complex and time consuming process.

Digital distribution systems, or "app stores," can help alleviate some of the issues presented by the traditional application model by centralizing the distribution of an application for use by many different computing devices, thereby reducing the complexities of application management.

One limitation of such app stores, however, is the application packaging procedure that many app stores require. Many app stores require that an application conform to a particular file format before the application can be registered and published for distribution by the app store. However, many applications, including legacy applications, do not conform to the distribution file format required by the app store. Consequently, such applications cannot be managed or distributed by the app store without rewriting the application to accommodate a particular app store packaging format.

SUMMARY

Described herein are one or more embodiments of a method for executing applications on a computing device. The method includes receiving, by an app store interface, a first distribution package from an app store, the first distribution package comprising a first virtual disk file comprising an application. The method further includes opening, by an application agent, the first virtual disk file based on a file type association (FTA) between the first virtual disk file and the application agent. The method also includes storing, by the application agent, the application in a second virtual disk file. The method further includes mounting the second virtual disk file at the computing device. The method also includes executing the application stored on the mounted second virtual disk file.

Further embodiments include a non-transitory computer-readable storage medium comprising instructions that cause a computer system to carry out the above method. Other embodiments include a processor and a memory that include a program executable in the processor to perform operations to carry out the above method.

DETAILED DESCRIPTION

Figure 1:
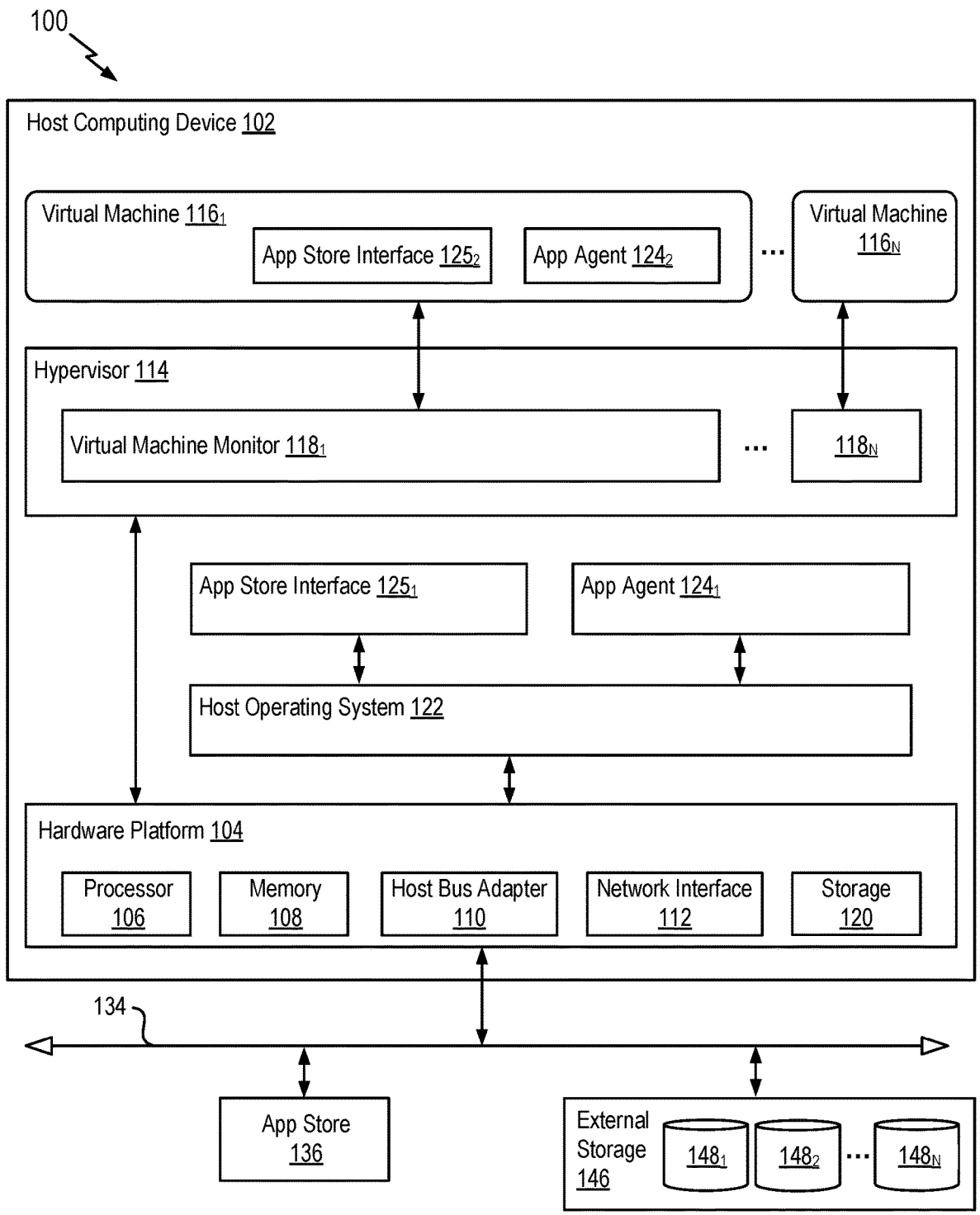
FIG. 1 is a block diagram conceptually illustrating an example of a hardware implementation for a computing system, according to some aspects of the disclosure.

Embodiments herein provide techniques for packaging, delivering, and consuming one or more heterogeneous applications by a physical computing device or a virtual computing instance (VCI), such as a virtual machine (VM), container, etc., running on a physical host machine. Heterogeneous applications are applications that may vary in formatting and/or compatibility between various operating systems (OS) and versions of OSs. In one example, some applications may be compatible with a current version of a Microsoft Windows OS (modern applications), whereas other applications are compatible with one or more previous versions of the Microsoft Windows OS (legacy applications). In another example, heterogeneous applications relate to applications having distinctive formatting (e.g., VMware App Volumes apps, VMware ThinApp apps, VMware Mirage apps, Microsoft App-V apps, Microsoft AppX, Microsoft MSIX, and Universal Windows Platform (UWP) apps).

The present disclosure describes aspects related to packaging an application for distribution by a digital distribution system, or "app store." According to certain embodiments, a user generates an application package by writing application data to a virtual disk file (e.g., a virtual hard disk (VHD)), and packaging the virtual disk file in a distribution file format.

The present disclosure further describes aspects related to delivering the application package from the app store to a computing device (e.g., downloading the application package to the computing device) and consuming the application package at the computing device (e.g., unpacking, storing, and mounting the virtual disk file on the computing device). According to certain embodiments, an app agent running on the computing device stores the virtual disk file from the application package and further mounts the virtual disk file so it is accessible by the computing device. One example of the app agent is an agent provided in VMware App Volumes made commercially available from VMware, Inc. In another embodiment, the app agent is configured to merge the virtual disk file from the application package into an existing virtual disk file mounted at the computing device. In some embodiments, the application package itself includes an installer configured to install the app agent on the computing device prior to storing the virtual disk file. Therefore, the computing device does not need to be preconfigured with the app agent.

Accordingly, aspects described herein are configured to enable utilization of the app store for centralized distribution of heterogeneous applications, while eliminating the need to rewrite the applications to conform to app store distribution file formats, and reducing the complexities of application management associated with traditional application delivery models.

Reference will now be made in detail to several embodiments, examples of which are illustrated in the accompanying figures. It is noted that wherever practicable, similar or like reference numbers may be used in the figures and may indicate similar or like functionality. The figures show embodiments for purposes of illustration only. Of course, alternative embodiments of the structures and methods illustrated herein may be employed without departing from the principles described.

FIG. 1 is a block diagram that illustrates a computer system 100 according to one or more embodiments of the present disclosure. Computer system 100 includes one or more hosts 102 that include a general purpose computer system constructed on a conventional, typically server-class, hardware platform 104. As shown, hardware platform 104 includes conventional physical components of a computing device, such as a processor 106 (CPU), a memory 108, a storage interface such as a host bus adapter (HBA) 110, a network interface 112, and a storage system 120. Processor 106 is configured to execute instructions, such as executable instructions stored in memory 108, in storage system 120, and/or in external storage 146 that perform one or more operations described herein. In some examples, storage system 120 and/or external storage 146 may store virtual disk files $148_1$-$148_N$ (collectively referred to as virtual disk files 148) that contain one or more applications. Thus, in some examples, the virtual disk files $148_1$-$148_N$ can be mounted on the computing device and applications thereon executed utilizing host 102 resources (e.g., host operating system (OS) 122).

Memory 108 is hardware allowing information, such as executable instructions, configurations, and other data, to be stored and retrieved. Memory 108 is where programs and data are kept when processor 106 is actively using them. Memory 108 may include, for example, one or more random access memory (RAM) modules.

Storage system 120 and external storage 146 represent persistent storage devices (e.g., one or more hard disks, flash memory modules, solid state disks (SSDs), and/or optical disks). The term "disk," as used herein, should not be construed as limited only to rotating disk storage media, but may also be construed to encompass SSDs. In some embodiments, storage system 120 and external storage 146 include high-density non-volatile memory. In some embodiments, one or more of storage system 120 and external storage 146 may include a shared storage system having one or more storage arrays of any type such as a network-attached storage (NAS) or a block-based device over a storage area network (SAN). In some embodiments, storage system 120 and/or external storage 146 may be implemented as software-defined storage such as VMware Virtual SAN made commercially available from VMware, Inc. that clusters together server-attached hard disks and/or solid state drives (HDDs and/or SSDs), to create a flash-optimized, highly resilient shared datastore designed for virtual environments. Storage system 120 and external storage 146 may be accessible by multiple hosts 102 via data network 134.

Data network 134 is a digital communications network which enables host 102 to communicate data with other nodes, such as external storage 146 and an app store 136. Data network 134 may be implemented using any suitable wired and/or wireless network(s) including one or more data buses, one or more local area networks (LANs), one or more wireless LANs, one or more cellular networks, the Internet, etc. HBA 110 enables host 102 to communicate with one or more external storages, such as the external storage 146. Hardware platform 104 also includes network interface 112, which enables host 102 to communicate with another device (e.g., the app store 136) via a communication medium, such as data network 134. An example of network interface 112 is a network adapter, also referred to as a network interface card (NIC).

Host 102 also includes a host OS 122, and host applications running on top of host OS 122. Examples of the host OS 122 include any of the well-known commodity OSs, such as Microsoft Windows, Linux, and the like. In some examples, the host applications include an app store interface $125_1$ and an app agent $124_1$.

App store interface $125_1$ is configured to facilitate delivery of an application package from app store 136 to a storage device of host 102 (e.g., storage system 120 and/or external storage 146), as well as uploading from host 102 to the app store 136. App store 136 may include one or more servers and/or hosts 102 running a manager configured to receive, store, and deliver application packages. Examples of app stores include a Microsoft Windows store, Microsoft System Center Configuration Manager (SCCM), Microsoft Azure, and AirWatch by VMware, Inc.

App agent $124_1$ may be configured to run as a service on the host OS 122 and use drivers (e.g., filter drivers) to handle application calls to applications stored on mounted virtual disk files 148 and to handle file-system redirects to the virtual disk files 148.

In some embodiments, host 102 is configured to provide a virtualization layer that abstracts processor, memory, storage, and networking resources of the hardware platform 104 into multiple virtual machines (VMs) $116_1$-$116_N$ (collectively referred to as VMs 116 and individually referred to as VM 116) that run concurrently on the same host 102. The virtualization layer, shown as a hypervisor 114, enables sharing of the hardware resources of host 102 with VMs 116. As shown in FIG. 1, hypervisor 114 is installed on top of hardware platform 104 and supports a virtual machine execution space within which multiple VMs 116 are instantiated. Hypervisor 114 architecture may vary. In some aspects, hypervisor 114 is installed as system level software directly on host 102 (often referred to as a "bare metal" installation) and can be conceptually interposed between the hardware platform 104 and a guest OS (not shown) operating in the VM 116. Alternatively, hypervisor 114 may conceptually run "on top of" the host OS 122. In some implementations, hypervisor 114 may comprise system level software as well as a privileged VM machine (not shown) that has access to the physical hardware resources of the host 102. In such implementations, a virtual switch, virtual tunnel endpoint (VTEP), etc., along with hardware drivers, may reside in the privileged VM. One example of hypervisor 114 is a VMware ESXi hypervisor provided as part of the VMware vSphere solution made commercially available from VMware, Inc. It should be noted, that the techniques discussed herein may be applicable to a host computing device running a VM, however, they are also applicable to a physical computing device 102 not running a VM, as discussed.

In the example of FIG. 1, VM $116_1$ includes (e.g., additionally or alternatively) another instance of an app store interface $125_2$ and app agent $124_2$. In some configurations, app store interface $125_2$ initiates calls using the VM 116 to a virtual machine monitors (VMMs) $118_1$-$118_N$ (collectively referred to as VMMs 118 and individually referred to as VM 118), which is responsible for exchanging packets between the VMM 118 and hypervisor 114 and providing virtual system support to coordinate operations between hypervisor 114 and the corresponding VM 116. The VMM 118 functionally enables hypervisor 114 to control data transfer operations between VMs 116 and app store 136 by passing information (e.g., data packets) to the true hardware devices (e.g., network interface 112) suitable for communicating over the data network 134.

App agent $124_2$ running on VM $116_1$ may be configured to run as a service on the VM 116 and use drivers (e.g., filter drivers) to handle application calls to applications stored on virtual disk files 148 and to handle file-system redirects to virtual disk files 148. For example, in order to mount virtual disk file 148, such as at logon time of the VM 116, the app agent $124_2$ communicates with storage system 120 or external storage 146 to pass information (e.g., virtual disk file 148 data) between the VM $116_1$ and the hardware platform 104 and/or external storage 146.

Production of the Application Package

Figure 2:
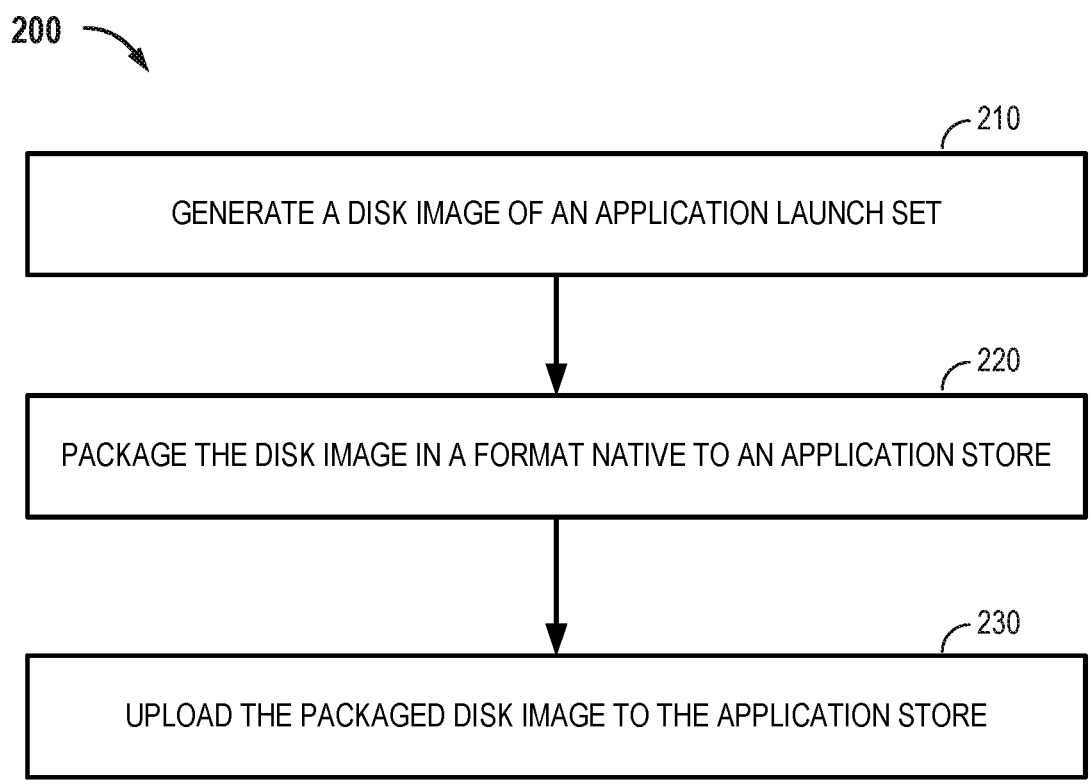
FIG. 2 is a flow diagram illustrating an exemplary method for packaging one or more applications into a distribution file format, according to some aspects of the disclosure.

FIG. 2 is a flow diagram that illustrates an exemplary method 200 for packaging one or more selected applications into a distribution file format for management and distribution of the one or more applications by an app store 136, according to some embodiments of the disclosure. In some examples, the distribution file format is required for uploading, registering, and publishing the one or more selected applications by the app store 136. The distribution file format includes any file type or format supported by the app store 136. Examples of the distribution file format include .APPX and .MSIX. In some examples, the method 200 may be carried out by a computing device, such as physical computing device 102 or VM 116 illustrated in FIG. 1. In some examples, the method 200 may be carried out by any suitable apparatus or means for carrying out the functions or algorithms described below.

The method 200 begins at step 210 by generating a virtual disk file (e.g., virtual disk file $148_1$) containing one or more applications. Examples of the virtual disk file $148_1$ include a .VMDK or .VMW formatted file, or any other suitable file format. Initially, a user selects an application from one or more applications stored locally on the host computing device 102 (e.g., storage system 120), or remotely (e.g., on external storage 146). The user then writes application data of the selected application to the virtual disk file $148_1$ utilizing any suitable software.

In one configuration, the user executes a common capture function of app agent 124 (e.g., app agent $124_1$ or $124_2$ of FIG. 1) to generate the virtual disk file $148_1$ containing an instance of the selected application. At the outset, and while common capture is running, the user will install and execute the selected application. While executing and performing operations of the selected application, common capture records files, directories, registry keys, metadata, and other application information associated with the selected application and the operations performed during the use of the selected application. Common capture then generates the virtual disk file $148_1$ containing the recorded data. Accordingly, common capture allows the user to generate an instance of the selected application based on the extent to which the selected application is utilized during its execution.

For example, the user may utilize common capture to generate a minimal-set instance of the application by allowing common capture to record only the data required for installation and execution of the selected application. Accordingly, the minimal-set instance of the selected application may be limited to a minimal set of data required to show and execute the selected application, and may not include one or more functions of the selected application. Common capture can then generate the virtual disk file $148_1$ containing the minimal-set instance of the selected application by writing the recorded data to an existing virtual disk file $148_1$, or generating a new virtual disk file $148_1$ containing the recorded data.

Accordingly, the user can utilize common capture to generate a virtual disk file $148_1$ having only a minimal-set instance of the selected application, or a virtual disk file 148 having an instance of the selected application having one or more functions that are in addition to the minimal set data (e.g., an instance of the selected application having the same spectrum of functions found in the selected application).

It should be noted that the file size of the virtual disk file $148_1$ generated by common capture will grow in proportion to the amount of application data common capture records. Consequently, a virtual disk file $148_1$ containing a fully functional instance of the selected application may have a significantly larger file size than a virtual disk file $148_1$ containing the minimal-set instance. In some cases, the user and/or host 102 may not have the resources required to support delivery of an application package containing such a large virtual disk file $148_1$.

Accordingly, a supplemental virtual disk file (e.g., virtual disk file $148_2$) may be required to provide the user with one or more additional functions of the selected application that are not included in the minimal-set instance. For example, while common capture will record the minimal set of data when the selected application is initially executed, the user can proceed to cause the executed application to perform additional functions or processes that common capture can record and write to the supplemental virtual disk file $148_2$. As such, when the user selects a relatively large application for packaging, the user can use common capture to record separate instances of the application, and generate multiple virtual disk files for each of the separately recorded instances. This allows the user to deliver a fully functional instance of a selected application in separate packages to another user with limited resources.

In some configurations, the minimal-set application may correspond to one application that is part of a software suite of two or more applications. In other configurations, the user can convert the one or more selected applications into an executable, virtualized application file (e.g., .EXE file) using application virtualization software (e.g., VMware ThinApp made commercially available from VMware, Inc.) instead of generating a virtual disk file. Accordingly, the application package can then be generated by packaging the virtualized application file into the distribution file format according to embodiments described below.

At step 220, the user utilizes the app store interface 125 (e.g., app store interface $125_1$ or $125_2$ of FIG. 1) or other suitable software to generate an application package by formatting one or more of the virtual disk file $148_1$ and/or the supplemental virtual disk file $148_2$ into a distribution file format supported by the app store 136. For example, the user may utilize a packaging application programming interface (API) of the app store interface 125 configured to create, read, and write application packages.

As discussed above, it may be advantageous to package separate instances of a selected application into separate packages. For example, the user may package the virtual disk file $148_1$ containing the minimal-set instance in one application package, and package one or more supplemental virtual disk files $148_2$ in one or more application packages. Alternatively, the user may package both the virtual disk file $148_1$ containing the minimal-set instance and a supplemental virtual disk file $148_2$ in the same application package. In this example, the user may configure the application package such that when the application package is delivered from the app store 136, the virtual disk file $148_1$ is delivered before the supplemental virtual disk file $148_2$.

The user may include one or more virtual disk files 148 (e.g., 148₁ and 148₂) in an application package, and may also include additional files in the same application package. For example, the user may include an app agent installer and/or an application package manifest. Additional information regarding the contents of an application package is described below in reference to FIG. 3.

At step 230, the user uploads the application package to app store 136 for distribution, via the app store interface 125.

Figure 3:
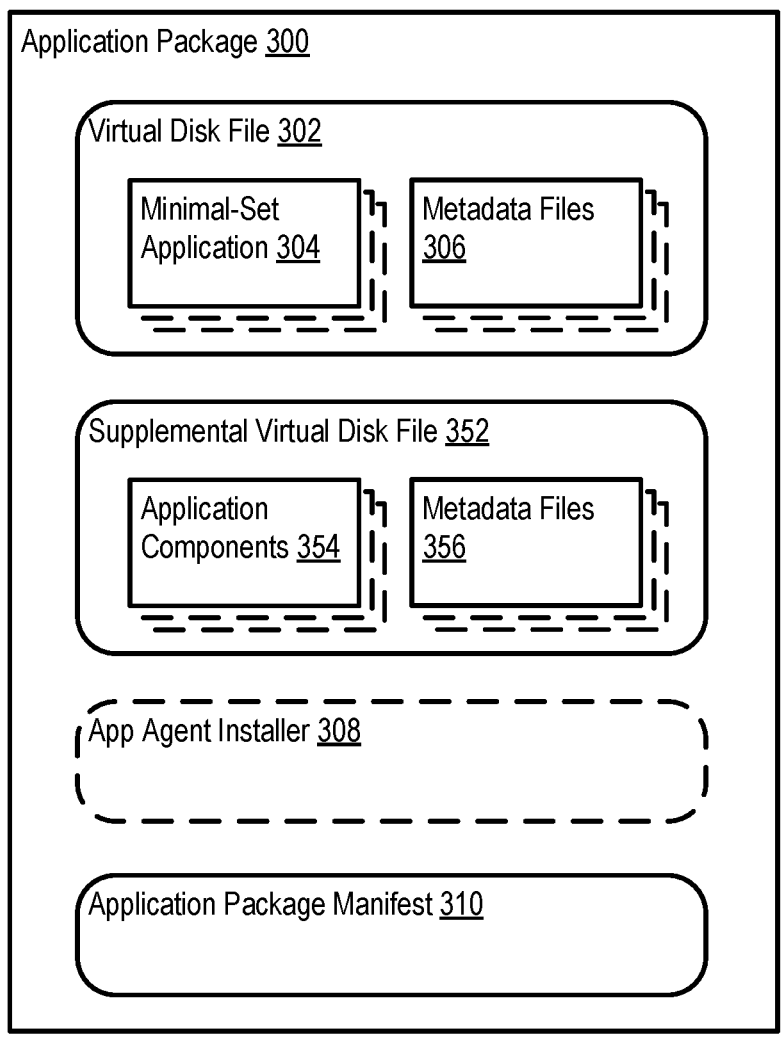
FIG. 3 is a block diagram conceptually illustrating an example application package for distribution by an app store, according to some aspects of the disclosure.

FIG. 3 is a block diagram illustrating an example application package 300 generated as a result of the method 200 described above. In this example, contents of the application package 300 include a virtual disk file 302, a supplemental virtual disk file 352, an app manifest 310, and optionally, an app agent installer, or "agent installer" 308. Agent installer 308 includes one or more files configured to install app agent 124 at a computing device, such as physical computing device 102 or VM 116.

The virtual disk file 302 includes one or more minimal-set applications 304 and one or more metadata files 306 corresponding to the minimal-set applications 304. The supplemental virtual disk file 352 contains one or more additional application components 354 corresponding to the one or more minimal-set applications 304, and metadata files 356 corresponding to the additional application components 354. The application components 354 may include additional application files or application data recorded by common capture of a selected application that are not included in the minimal-set application 304. Although FIG. 3 illustrates two virtual disk files 302 and 352 packaged in a single application package 300, it should be noted that in certain embodiments the two virtual disk files 302 and 352 can be separated into two application packages.

In some configurations, the application package 300 includes an application bundle having one or more software suites that each include multiple applications. For example, a software suite may include Microsoft Office, Adobe, Internet browsers, etc. In one example, the virtual disk file 302 may include a plurality of minimal-set applications 304 each corresponding to an application in a software suite, and contained in a single application package 300.

The app manifest 310 is a file or a policy setting of the application package 300 configured to convey content information of the application package 300 to the app store interface 125. In one embodiment, the app manifest 310 is an XML file containing identifiers, commands, and/or parameters associated with the files contained in the application package 300. The app manifest 310 may include a file type or extension of one or more of the files contained in the application package in order to indicate a file type association (FTA) with a default handler of the files. For example, if the virtual disk file 302 is a file having a .VHD file extension, the app manifest 310 may identify the virtual disk file 302 as a package to be opened by the app agent 124 (e.g., the app manifest identifies the file as a .VMW file).

Delivery and Consumption of the Application Package

Figure 4:
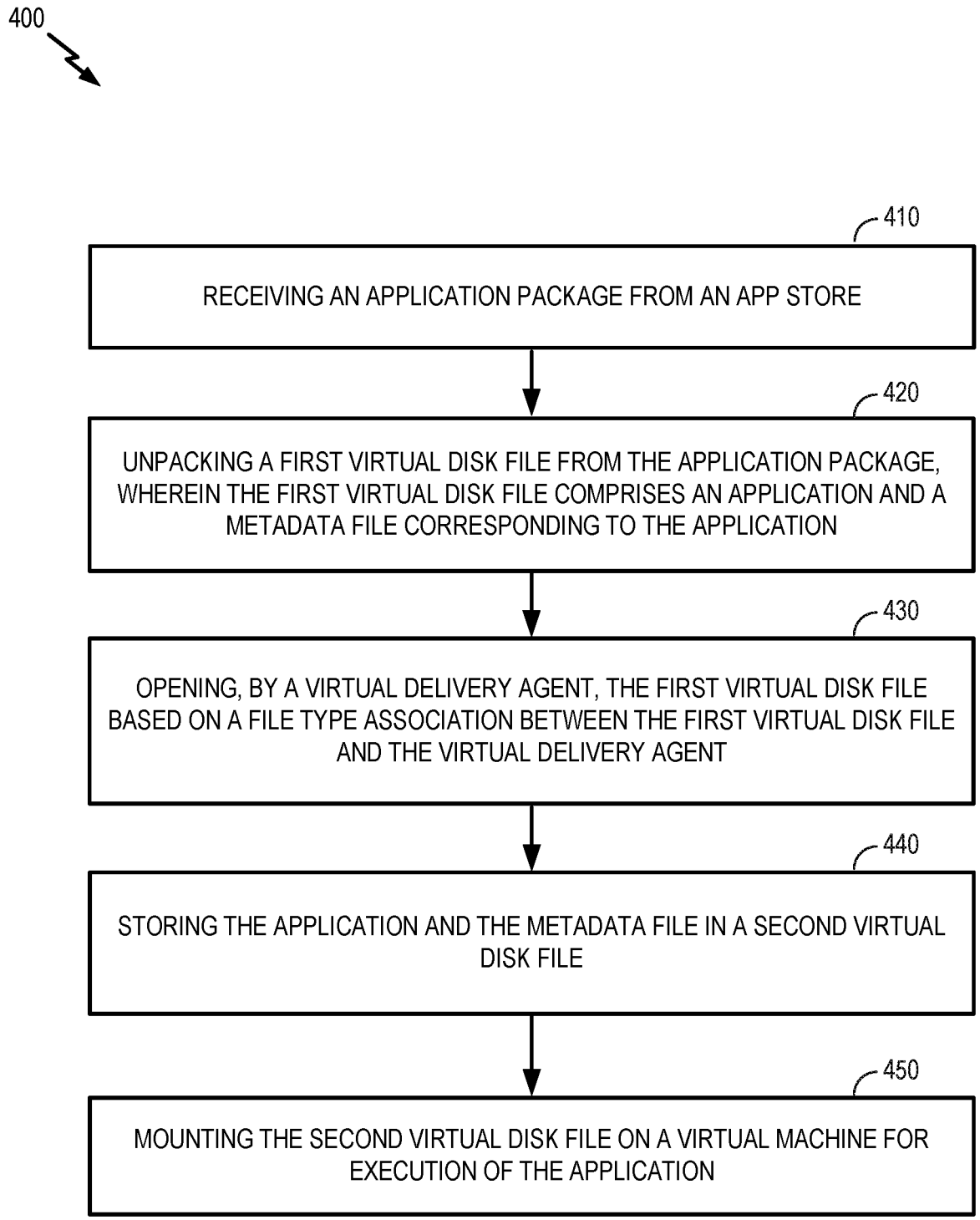
FIG. 4 is a flow diagram that illustrates an exemplary method for receiving and consuming an application package, according to some aspects of the disclosure.

FIG. 4 is a flow diagram that illustrates an exemplary method 400 for receiving and consuming an application package generated as a result of the method 200 described above. Though certain embodiments are described herein with respect to delivering applications to physical computing devices, it should be noted that similar techniques may be used to deliver applications to other types of computing devices, including VCIs and VMs.

The method 400 begins at step 410 where an app store interface 125 receives an application package 300 delivered from an app store 136. The app store interface 125 may store the application package 300 in a local storage device (e.g., storage system 120) or a remote storage device (e.g., external storage 146).

At step 420, the app store interface 125 opens the application package 300 to unpack its contents. The unpacking operation is configured to extract and store the contents of the application package 300. In some examples, the app store interface 125 generates the virtual disk file 302 and stores it on the local storage device by extracting data from the application package 300.

In some configurations, the unpacking of data contained in the application package 300 is performed in parallel. For example, contents of the application package (e.g., virtual disk file 302 and app agent installer 308) are unpacked simultaneously. In other configurations, unpacking may be performed serially. For example, the application package 300 may be configured such that data relating to certain packaged content (e.g., app agent installer 308) is received before other data (e.g., virtual disk file 302). In this example, the app store interface 125 unpacks the contents of the application package 300 in the order that the contents are delivered.

In some configurations, the application package 300 is configured such that certain content of the package is delivered prior to other content in the application package 300, and/or unpacked prior to the other content. In one example, an application package containing an app agent installer 308 is delivered to the app store interface 125. In this example, the application package 300 is configured such that the app store interface 125 receives and unpacks the app agent installer 308 prior to other content in the application package 300. Accordingly, an instance of an app agent 124 can be installed and executed by computing device 102 prior to the unpacking of other data (e.g., virtual disk file 302) contained in the application package 300. This configuration ensures that an application suitable for opening the other contents of the application package 300 is installed prior to unpacking the other contents. As such, the application package 300 can be configured for controlled delivery of its contents in an order that prepares the computing device 102 to handle other contents unpacked from the application package 300.

Referring to the example application package 300 shown in FIG. 3, the application package 300 includes a virtual disk file 302 having a minimal set application 304, and a supplemental virtual disk file 352 having application components 354 configured to enhance the functionality of the minimal-set application 304. In this example, the application package 300 is configured such that the virtual disk file 302 is delivered and unpacked prior to unpacking the supplemental virtual disk file 352. Accordingly, the virtual disk file 302 is delivered and unpacked by the app store interface 125 prior to unpacking the supplemental virtual disk file 352. As such, the app agent 124 can open the virtual disk file 302 while the supplemental virtual disk file 352 is delivered.

In some configurations, the app manifest 310, a policy file, and/or a setting of the application package 300 includes information configured to identify a storage location for the app store interface 125 to store unpacked contents of the application package 300. For example, the app manifest 310 includes an address of a location of storage system 120 configured to indicate where the app store interface 125 is to store the unpacked contents of the application package 300. This enables access to the unpacked contents by a default handler (e.g., app agent 124, host OS 122 services, etc.) operating on the computing device 102. For example, app agent 124 can be registered as the default handler for opening unpacked virtual disk files 302 and 352 so that the user may use the app agent 124 as the default handler for the particular file type(s) of the unpacked virtual disk files 302 and 352.

Once the one or more of contents of the application package 300 are unpacked, the method 400 moves onto step 430, where the app agent 124 opens the unpacked content. Here, the app store interface 125 calls the host OS 122 to launch a default handler to open the unpacked content.

In one example, the app store interface 125 receives and unpacks the app agent installer 308 from the application package 300, and calls the host OS 122 to open the unpacked installer using a default handler to install the app agent 124 on the computing device 102. Upon installation, the app agent 124 can be registered as the default handler for file type(s) of virtual disk files.

In some configurations, the app store interface 125 unpacks the application package 300 and open its contents in a container environment. The container is an intermediate layer between the host OS 122 and the app store interface 125 that is configured to isolate the operations of the app store interface 125 from those of the host OS 122. For example, Microsoft App-V and MSIX, and VMware ThinApp provide containerization for applications. In this configuration, the app store interface 125 may attempt to open a file that has been unpacked from the application package 300 so that the file will be executed in the container environment. Initially, when the app store interface 125 begins to execute the file, the app store interface 125 will call an entry point (e.g., OnLaunched( )) of the file which will trigger a call to a default handler of the file based on the FTA of that file.

In one example, the app store interface 125 unpacks the app agent installer 308 from the application package 300 and proceeds to initiate execution of the installer in the container environment. Upon initiation, the app store interface 125 will call an entry point of the installer which triggers a call to a default handler of the installer. Because whether a default handler is called may depend on the FTA of the unpacked file, the FTA for the app agent installer 308 can be identified in the app manifest 310. In one example, the FTA of the app agent installer 308 identifies the default handler as an executable installer service (e.g., msiexec.exe) of the host OS 122. Accordingly, when the app store interface 125 calls the entry point of the installer, the app store interface 125 calls the host OS 122 to open the app agent installer 308 using the executable installer service. Accordingly, the app agent installer 308 can install the app agent 124 and register the app agent 124 with the host OS 122 as a default handler for opening locally unpacked and stored virtual disk files.

In another example, the app store interface 125 unpacks the virtual disk file 302 from the application package 300 and proceeds to initiate processing of the virtual disk file 302 in the container environment. The app store interface 125, through instructions contained in app manifest 310, opens the virtual disk file 302, which triggers a call to the default handler. Because whether a default handler is called may depend on the FTA of the unpacked file, the FTA for the virtual disk file 302 can be identified in the app manifest 310. In one example, the FTA of the virtual disk file 302 identifies the default handler as app agent 124 installed on the host OS 122. Accordingly, when the app store interface 125 calls the host OS 122 to open the virtual disk file 302, the app store interface 125 calls the host OS 122 to open the virtual disk file 302 using the app agent 124.

Accordingly, the app store interface 125 may utilize the app manifest 310 for identifying a file type of the application package 300 contents, and redirecting handling of the contents to a default handler outside of the container environment once the contents are unpacked.

At step 440, app agent 124 stores content of one or more of the virtual disk file 302 or the supplemental virtual disk file 304 as a second virtual disk file. In some configurations, the app agent 124 creates and stores the second virtual disk file as a new virtual disk file. In another configuration, the app agent 124 merges, or copies, some or all of the content of the virtual disk file 302 into an existing virtual disk file (e.g., virtual disk file 148) stored locally (e.g., storage system 120) or remotely (e.g., external storage 146). In this way, application data from a virtual disk file 302 unpacked from an application package 300 can be merged into pre-existing virtual disk files 148 stored on host 102 or remotely. Accordingly, the second virtual disk file may include a modified version of an existing virtual disk file 148.

In one example, the virtual disk file 302 contains a minimal-set instance of an application that does not exist on an existing virtual disk file 148. In this example, the app agent 124 creates the second virtual disk file by writing the minimal-set application data (e.g., the minimal set application 304 and the metadata files 306) of the virtual disk file 302 to the existing virtual disk file 148.

In another example, the supplemental virtual disk file 352 contains an additional application component 354 configured to provide additional functionality to a minimal-set application already stored on the existing virtual disk file 148. The app agent 124 writes the application component data (e.g., the additional components 354 and the metadata files 356) from the supplemental virtual disk file 352 to the existing virtual disk file 148. Accordingly, modern and legacy applications stored on existing virtual disk files 148 can be dynamically maintained and updated, allowing a user to enhance the functionality of their applications over time.

In another example, the app agent 124 stores the second virtual disk file by logically merging the content of one or more of the virtual disk file 302 or the supplemental virtual disk file 352 with content of an existing virtual disk file 148. For example, supplemental virtual disk file 352 can be attached to computing device 102. The act of attaching the supplemental virtual disk file 352 includes mapping, mounting, or otherwise making available the content of the supplemental virtual disk file 352 to computing device 102, such as part of the existing virtual disk file 148 (i.e., a merged view), and/or modifying registry keys, file paths, and other information to make the content appear as though it has been locally installed on the computing device 102 (i.e., a physically merged view).

Initially, attaching the supplemental virtual disk file 352 to the computing device 102 may present a merged view of the existing virtual disk file 148 and the virtual disk file 352 to the host OS 122 (i.e., a directory query of the existing virtual disk file 148 will return the content of both the existing virtual disk file 148 and the supplemental virtual disk file 352) prior to a copy of content from supplemental virtual disk file 352 to the existing virtual disk file 148. In some examples, a background process of the host OS 122 may utilize a low-priority thread to copy content from supplemental virtual disk file 352 into an inactive storage location of the storage system 120 and/or external storage 146. Once the copy is complete, possibly across multiple logon sessions, the host OS 122 activates the previously inactive storage location to present a physically merged view of the existing virtual disk file 148 and the content copied from supplemental virtual disk file 352. It should be noted that the user may configure host OS 122 to toggle whether the logical merge corresponds to the merged view of the existing virtual disk file 148 or a background copy resulting in the physically merged view.

At step 450, the second virtual disk file is mounted to allow a user of the computing device 102 to execute the applications contained therein, where an application, and/or a portion of the application were delivered from the application package 300.

As noted previously, the application package 300 may be configured such that the virtual disk file 302 is delivered and unpacked prior to unpacking the supplemental virtual disk file 352. Accordingly, the virtual disk file 302 may be delivered and unpacked by the app store interface 125 prior to unpacking the supplemental virtual disk file 352. As such, the app agent 124 can open and store the minimal-set application 304 of the virtual disk file 302 in the second virtual disk file, mount the second virtual disk file, and execute the minimal-set application while the supplemental virtual disk file 352 is delivered. This provides the user with the ability to execute the minimal-set application 304 while the application components 354 of the supplemental virtual disk file 352 are automatically delivered, unpacked, and stored by the app agent 124, thus providing for seamless integration of the application components 354 into the stored second virtual disk file while the user executes the minimal-set application.

Additional Considerations

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the client or endpoint and hypervisors as an example for the hardware abstraction layer. As described above, each virtual machine includes a guest operating system (OS) in which at least one application runs. These embodiments may also apply to other examples of endpoints/clients, such as containers, which do not include a guest OS, referred to herein as "OS-less containers." OS-less containers implement OS-level virtualization, wherein an abstraction layer is provided on top of the kernel of an OS on a host computer. The abstraction layer supports multiple OS-less containers each including an application and its dependencies. Each OS-less container runs as an isolated process in user space on the host OS and shares the kernel with other containers. The OS-less container relies on the kernel's functionality to make use of resource isolation (CPU, memory, block input/output (I/O), network, etc.) and separate namespaces and to completely isolate the application's view of the operating environments. By using OS-less containers, resources can be isolated, services restricted, and processes provisioned to have a private view of the OS with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of this disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization.

The virtualization software can therefore include components of a host, console, or guest OS that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

We claim:

1. A method of executing applications on a computing device, the method comprising:
   receiving, by an app store interface;
      a first distribution package from an app store, the first distribution package comprising a first virtual disk file comprising an application, and
      a second distribution package from the app store, the second distribution package comprising a second virtual disk file comprising additional data not included in the first virtual disk file, wherein the additional data is configured to enable the application of the first virtual disk file to execute a function;
   opening, by an application agent, the first virtual disk file based on a file type association (FTA) between the first virtual disk file and the application agent;
   storing, by the application agent, the application in a third virtual disk file;
   merging, by the application agent, the additional data into the third virtual disk file after storing the application of the first virtual disk file in the third virtual disk file;
   mounting the third virtual disk file at the computing device; and
   executing the application stored on the mounted third virtual disk file.

2. The method of claim 1, wherein the application agent is configured to generate the FTA between the first virtual disk file and the application agent.

3. The method of claim 1, further comprising unpacking, by the app store interface, the first virtual disk file from the first distribution package, wherein the unpacking is configured to extract data corresponding to the application from the first distribution package.

4. The method of claim 1, further comprising unpacking, by the app store interface, the first virtual disk file from the first distribution package within a container environment configured to isolate app store interface processes from a process outside of the container environment, wherein the FTA causes the app store interface to call the process outside of the container environment to open the unpacked first virtual disk file.

5. The method of claim 1, wherein the first distribution package further comprises an installer file configured to install the application agent on the computing device, and wherein the method further comprises:
   unpacking, by the app store interface, the installer file from the first distribution package;
   calling, by the app store interface, an operating system of the computing device to install the application agent utilizing the installer file; and
   unpacking, by the app store interface, the first virtual disk file from the first distribution package after calling the operating system to install the application agent.

6. The method of claim 1, wherein the first distribution package further comprises a fourth virtual disk file, the fourth virtual disk file comprising supplemental data not included in the first virtual disk file or the second virtual disk file, wherein the supplemental data is configured to enable the application of the first virtual disk file to execute another function.

7. The method of claim 6, further comprising:
   opening, by the application agent, the fourth virtual disk file after storing the application in the third virtual disk file; and
   merging, by the application agent, the supplemental data of the fourth virtual disk file into the third virtual disk file to enable the application to execute the other function.

8. The method of claim 6, wherein the first distribution package is configured to control an order in which the app store interface receives the first virtual disk file and the fourth virtual disk file.

9. The method of claim 1,
   wherein merging the additional data comprises one or more of:
      a merged view of the additional data in the third virtual disk file, or
      a physical copy of the additional data in the third virtual disk file.

10. A non-transitory computer-readable storage medium comprising instructions that, when executed in a computing device, perform a method of executing applications on a computing device, the method comprising:
    receiving, by an app store interface;
       a first distribution package from an app store, the first distribution package comprising a first virtual disk file comprising an application, and
       a second distribution package from the app store, the second distribution package comprising a second virtual disk file comprising additional data not included in the first virtual disk file, wherein the additional data is configured to enable the application of the first virtual disk file to execute a function;
    opening, by an application agent, the first virtual disk file based on a file type association (FTA) between the first virtual disk file and the application agent;
    storing, by the application agent, the application in a third virtual disk file;
    merging, by the application agent, the additional data into the third virtual disk file after storing the application of the first virtual disk file in the third virtual disk file;
    mounting the third virtual disk file at the computing device; and
    executing the application stored on the mounted third virtual disk file.

11. The method of claim 10, wherein the application agent is configured to generate the FTA between the first virtual disk file and the application agent.

12. The non-transitory computer-readable storage medium of claim 10, wherein the method further comprises unpacking, by the app store interface, the first virtual disk file from the first distribution package, wherein the unpacking is configured to extract data corresponding to the application from the first distribution package.

13. The non-transitory computer-readable storage medium of claim 10, wherein the method further comprises unpacking, by the app store interface, the first virtual disk file from the first distribution package within a container environment configured to isolate app store interface processes from a process outside of the container environment, wherein the FTA causes the app store interface to call the process outside of the container environment to open the unpacked first virtual disk file.

14. The non-transitory computer-readable storage medium of claim 10, wherein the first distribution package further comprises an installer file configured to install the application agent on the computing device, and wherein the method further comprises:
   unpacking, by the app store interface, the installer file from the first distribution package;
   calling, by the app store interface, an operating system of the computing device to install the application agent utilizing the installer file; and
   unpacking, by the app store interface, the first virtual disk file from the first distribution package after calling the operating system to install the application agent.

15. The non-transitory computer-readable storage medium of claim 10, wherein the first distribution package further comprises a fourth virtual disk file, the fourth virtual disk file comprising supplemental data not included in the first virtual disk file or the second virtual disk file, wherein the supplemental data is configured to enable the application of the first virtual disk file to execute another function.

16. The non-transitory computer-readable storage medium of claim 15, wherein the method further comprises:
   opening, by the application agent, the fourth virtual disk file after storing the application in the third virtual disk file; and
   merging, by the application agent, the supplemental data of the fourth virtual disk file into the third virtual disk file to enable the application to execute the other function.

17. The non-transitory computer-readable storage medium of claim 15, wherein the first distribution package is configured to control an order in which the app store interface receives the first virtual disk file and the fourth virtual disk file.

18. The non-transitory computer-readable storage medium of claim 10, wherein merging the additional data comprises one or more of:
   a merged view of the additional data in the second virtual disk file, or
   a physical copy of the additional data in the second virtual disk file.

19. A computing device, comprising:
a processor; and
a memory communicatively coupled to the processor, wherein the memory includes a program executable in the processor to perform a method for executing an application, the method comprising:
   receiving, by an app store interface;
      a first distribution package from an app store, the first distribution package comprising a first virtual disk file comprising an application, and
      a second distribution package from the app store, the second distribution package comprising a second virtual disk file comprising additional data not included in the first virtual disk file, wherein the additional data is configured to enable the application of the first virtual disk file to execute a function;
   opening, by an application agent, the first virtual disk file based on a file type association (FTA) between the first virtual disk file and the application agent;
   storing, by the application agent, the application in a third virtual disk file;
   merging, by the application agent, the additional data into the third virtual disk file after storing the application of the first virtual disk file in the third virtual disk file;
   mounting the third virtual disk file at the computing device; and
   executing the application stored on the mounted third virtual disk file.

20. The computing device of claim 19, wherein the method further comprises unpacking, by the app store interface, the first virtual disk file from the first distribution package, wherein the unpacking is configured to extract data corresponding to the application from the first distribution package.

* * * * *